(No Model.)

J. F. MUNZ & C. MOLNO.
HARROW.

No. 297,084.  Patented Apr. 15, 1884.

Attest
A. Cavileer
Thos Strong

Inventors
Jacob F. Munz
Charles Molno
by Henry Millward,
their attorney.

United States Patent Office.

JACOB F. MUNZ AND CHARLES MOLNO, OF SPRINGFIELD, OHIO.

HARROW.

SPECIFICATION forming part of Letters Patent No. 297,084, dated April 15, 1884.

Application filed October 1, 1883. (No model.)

*To all whom it may concern:*

Be it known that we, JACOB F. MUNZ and CHARLES MOLNO, of Springfield, county of Clark, State of Ohio, have invented a new and useful Improvement in Harrows, of which the following is a specification.

Figure 1:
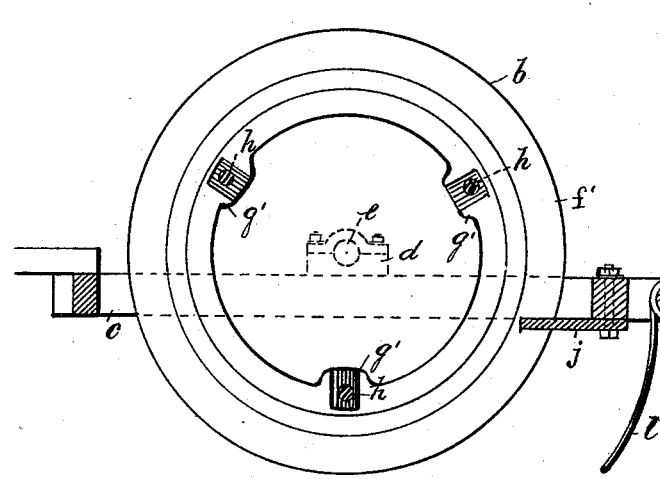
Figure 2:
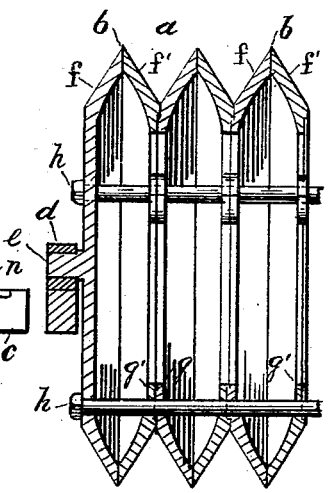
Figure 3:
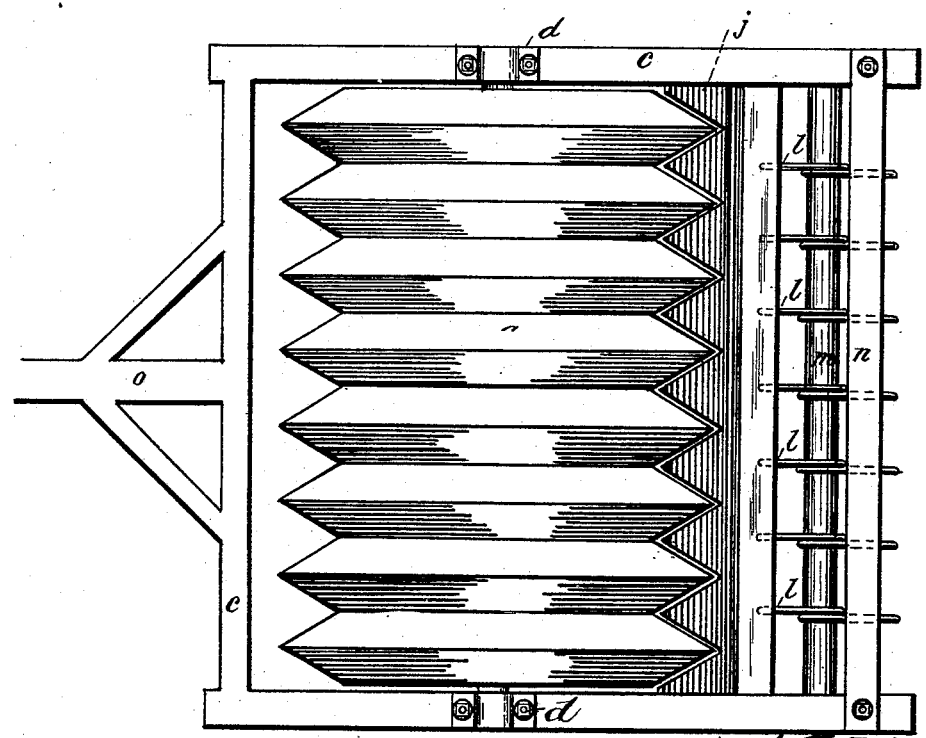

In the accompanying drawings, Figure 1 is a longitudinal sectional elevation through a a harrow embodying our improvements. Fig. 2 is a transverse section of a portion of the same, and Fig. 3 is a plan view.

In each of these figures letters of like character indicate corresponding parts.

The invention relates to harrows provided with a roller or rollers made up by a series of V-shaped cutters, that form a corrugated surface to said roller, a similarly-shaped clearing-plate entering the cavities of said corrugated roller, and a series of spring-teeth in the rear of said plate arranged to harrow the soil after it has been pulverized by the aforesaid roller.

In order that others skilled in the art to which our invention belongs may be able to make and use the same, we will proceed to describe its construction and operation.

The roller $a$, provided with V-shaped cutting-disks $b$, is mounted upon a main-frame, $c$, by means of journal-boxes $d$ and journals $e$. These V-shaped disks are constructed by uniting the two dish-shaped parts $f f'$ by means of ears $g g'$, one set of which is provided with projections, while the other set is provided with corresponding cavities to receive the said projections. Through these ears we pass bolts $h$, that extend through the whole series of disks, and are then secured by nuts. In place of the short journals $e$, a shaft may extend through the entire series of said disks for the purpose of forming journals for the roller to rotate upon.

In rear of the roller $a$ we use a clearing-plate, $j$, that has V-shaped projections entering the cavities made by the intersections of disks $b$. We use this plate to prevent these cavities from becoming filled with soil, and we thereby add to their usefulness as pulverizers.

In the rear of the clearing-plate we use a series of spring-teeth, $l$, that follow the roller $a$ and serve as auxiliaries to more completely pulverize the soil and leave it in better condition for seeding. These teeth are made of spring metal, and each one of them is coiled one or more times around a stationary cross-tie, $m$, in a suitable manner for one end to extend to the ground, for the purpose specified, while the other end passes under another cross-tie, $n$, and is thereby held to its work. The frame $c$ is provided with a pole or shafts, $o$, for purposes of attaching the draft.

Having thus described our invention, what we claim as new, and desire to secure by Letters Patent, is—

1. A harrow provided with a roller having V-shaped cutting-disks, each of said disks constructed with two dish-shaped parts that are united through the agency of coincident projections and cavities through which bolts pass to bind the entire series of disks together, substantially as and for the purpose specified.

2. A harrow provided with a roller having V-shaped cutting-disks, each constructed with two dish-shaped parts, and the entire series being bound together through the agency of bolts passing through their entire length, and provided with a clearing-plate having V-shaped parts that enter the cavities between the disks, substantially as and for the purpose specified.

In testimony whereof we have hereunto set our hands this 10th day of September, 1883.

JACOB F. MUNZ.
CHARLES MOLNO.

Witnesses:
HENRY MILLWARD,
P. J. CLEVENGEN.